United States Patent
Yen

(10) Patent No.: US 7,646,947 B2
(45) Date of Patent: Jan. 12, 2010

(54) OPTICAL SWITCH

(75) Inventor: Kuo-An Yen, Hsinchu (TW)

(73) Assignee: Arcadyan Technology Corporation, Hsinchu (TW)

( * ) Notice: Subject to any disclaimer, the term of this patent is extended or adjusted under 35 U.S.C. 154(b) by 26 days.

(21) Appl. No.: 11/850,672

(22) Filed: Sep. 5, 2007

(65) Prior Publication Data

US 2008/0267558 A1    Oct. 30, 2008

(30) Foreign Application Priority Data

Apr. 25, 2007   (TW) .............................. 96114545 A

(51) Int. Cl.
*G02B 6/26*   (2006.01)
*G02B 6/42*   (2006.01)

(52) U.S. Cl. .............................. 385/22; 385/25; 385/52

(58) Field of Classification Search .................... 385/22
See application file for complete search history.

(56) References Cited

U.S. PATENT DOCUMENTS 6,044,186 A    3/2000  Chang et al.
6,385,365 B1   5/2002  Rosete et al.
2003/0091272 A1*  5/2003  Sigloch et al. ................. 385/22
2003/0133648 A1*  7/2003  Mitsuoka et al. .............. 385/22

* cited by examiner

*Primary Examiner*—Uyen-Chau N Le
*Assistant Examiner*—Kajli Prince
(74) *Attorney, Agent, or Firm*—Jianq Chyun IP Office

(57) ABSTRACT

An optical switch including an alignment head, a first fiber, a second fiber, a third fiber, a wedge, and a displacing means is provided. The alignment head has a base and a cover. The base has a first V-groove, a second V-groove, and a trench linked to the first and the second V-grooves. An end of the first fiber and that of the second fiber are mounted in the first and the second V-grooves, respectively. The cover is mounted on the base to secure the ends of the first and the second fibers. An end of the third fiber located in the trench is aligned to that of the first fiber. The wedge located beside the base has an incline. The displacing means set under the wedge is capable of aligning the end of the third fiber to that of the second fiber by moving the wedge.

4 Claims, 6 Drawing Sheets

OPTICAL SWITCH

CROSS-REFERENCE TO RELATED APPLICATION

This application claims the priority benefit of Taiwan application serial no. 96114545, filed Apr. 25, 2007. All disclosure of the Taiwan application is incorporated herein by reference.

BACKGROUND OF THE INVENTION

1. Field of the Invention

The present invention relates to an optical communication system, and more particularly to an optical switch employed in the optical communication system.

2. Description of Related Art

With rapid development in fiber optics communication, optical fibers are widely embedded all over the world, so as to provide wider bandwidth and better reliability than copper wires, microwave relays and satellites do. An optical communication system includes a large number of optical switches for transmitting signals through specific network routes. The optical switch is capable of selecting one of the optical fibers and alternatively aligning ends of two optical fibers, such that light beams can be transmitted from one of the optical fibers to the other.

The optical switch should be characterized by high reliability, low insertion loss, low back reflection, and so forth. The insertion loss may reduce the strength of the signals, while reflected signals may result in crosstalk effects. Accordingly, in order to comply with demands on operating the optical switch, the ends of the two optical fibers should be aligned in both an axial direction and a horizontal direction. Due to a small position tolerance of the optical fibers of the optical switch, the alignment of the optical fibers is rather time-consuming during the process of manufacturing the optical switch, leading to an increase in the production costs.

Referring to FIG. 1, a fiber optic switching apparatus 100 disclosed in the U.S. Pat. No. 6,385,365 includes two alignment heads 112 and 114, two output optical fibers 122 and 124, and an input optical fiber 130. An end 122a of one output optical fiber 122 is mounted in a V-groove 112a of the alignment head 112, while an end 124a of the other output optical fiber 124 is mounted in a V-groove 114a of the alignment head 114. Besides, a movable end 130a of the input optical fiber 130 is located between the two V-grooves 112a and 114a. In a first condition, the end 130a of the input optical fiber 130 is aligned to the bottom end 122a of the output optical fiber 122.

FIG. 2 is a side view illustrating the optical switch of FIG. 1 in a second condition. Referring to FIGS. 1 and 2, in order to align the end 130a of the input optical fiber 130 depicted in FIG. 1 to the end 124a of the upper output optical fiber 124, the fiber optic switching apparatus 100 further includes a relay 140 to uplift the end 130a of the input optical fiber 130. Accordingly, as the end 130a of the input optical fiber 130 is elevated by the relay 140, the end 130a of the input optical fiber 130 can be aligned to the end 124a of the upper output optical fiber 124, as shown in FIG. 2.

On the contrary, as the end 130a of the input optical fiber 130 is lowered down by the relay 140, the end 130a of the input optical fiber 130 can be again aligned to the end 122a of the bottom output optical fiber 122. Therefore, light beam signals can be alternatively transmitted from the input optical fiber 130 to the output optical fiber 122 or 124 by adopting the relay 140 for arranging the positions of the output optical fibers 122 and 124 relative to the position of the input optical fiber 130.

However, during the process of respectively assembling the output optical fibers 122 and 124 to the alignment heads 112 and 114, the relative positions of the alignment heads 112 and 114 and the relative positions of the output optical fibers 122 and 124 are in great variations, and thus the difficulty of assembling the fiber optic switching apparatus 100 is then increased.

Further, U.S. Pat. No. 6,385,365 discloses an alignment head having a through hole in a diamond shape for defining two output optical fibers. In spite of omitting the alignment between two alignment heads, the single alignment head having the through hole in the diamond shape is still not able to alleviate difficulties of assembling the optical fibers in an effective manner.

Besides, another optical switch using the relay to control the position of the input optical fiber relative to the positions of the output optical fibers is disclosed by U.S. Pat. No. 6,044,186. However, said patent is not conducive to reducing the complexity of assembling the optical fibers. Since the main production costs of the optical switch lie in labor hours spent on assembling the optical fibers, it is imperative to reduce the production costs by alleviating the difficulties of assembling the optical fibers.

SUMMARY OF THE INVENTION

The present invention is directed to an optical switch for reducing production costs.

The present invention is further directed to an optical switch for improving reliability.

The present invention is further directed to an optical switch for undergoing strict condition inspection easily and successfully.

The present invention provides an optical switch including an alignment head, a first fiber, a second fiber, a third fiber, a wedge, and a displacing means. The alignment head has a base and a cover. The base has a first V-groove, a second V-groove, and a trench linked to the first and the second V-grooves. An end of the first fiber is mounted in the first V-groove. An end of the second fiber is mounted in the second V-groove. The cover is mounted on the base to secure the ends of the first and the second fibers. An end of the third fiber is located in the trench and aligned to the end of the first fiber. The wedge is located beside the base and has an incline. The displacing means is set under the wedge.

As the end of the third fiber is aligned to the end of the first fiber, the displacing means is capable of moving the wedge in a first direction and applying a component force in a second direction through a contact to the incline of the wedge to push the third fiber, so as to move the end of the third fiber in the trench in the second direction and to align the end of the third fiber to the end of the second fiber.

According to an embodiment of the present invention, as the end of the third fiber is aligned to the end of the second fiber, the displacing means is capable of moving in a third direction opposite to the first direction, such that the incline of the wedge does not push the third fiber. In addition, the end of the third fiber moves in a fourth direction opposite to the second direction to again align the end of the third fiber to the end of the first fiber.

According to an embodiment of the present invention, the first direction is substantially perpendicular to the second direction.

According to an embodiment of the present invention, the first and the second V-grooves are arranged in the second direction, and a length direction of the first V-groove is parallel to a length direction of the second V-groove.

According to an embodiment of the present invention, the displacing means may be a relay or an actuator.

In view of the foregoing, the present invention is able to directly mount the two output optical fibers (the first and the second optical fibers) in the V-grooves on the single alignment head formed by precision processing. Through a simple assembling process, the precise alignment of the input optical fiber (the third optical fiber) is completed, thus simplifying the time-consuming alignment process of the conventional optical fibers. Moreover, the present invention may utilize the displacing means along with the wedge having the incline for meeting the requirements for horizontal movement on an axial plane between the input optical fiber and the two output optical fibers. Furthermore, the displacing means providing a small amount of displacement can be adopted to induce large displacement of the optical fiber through increasing a slope of the incline of the wedge.

In order to make the aforementioned and other features and advantages of the present invention more comprehensible, an embodiment accompanied with figures is described in detail below.

DESCRIPTION OF EMBODIMENTS

Figure 1:
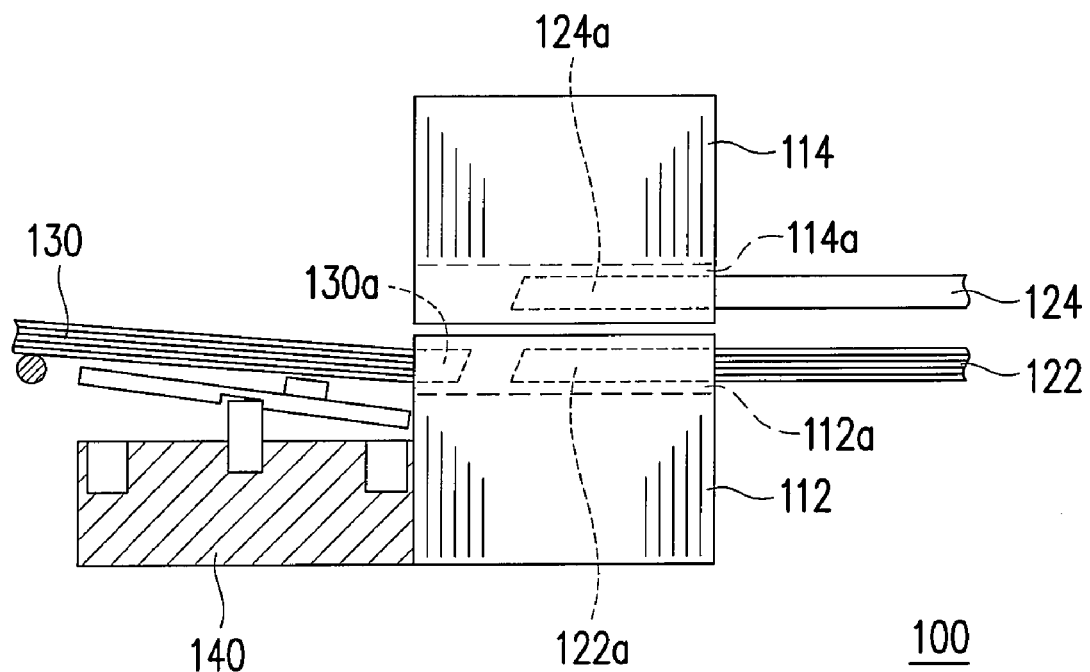
FIG. 1 is a side view illustrating a conventional optical switch in a first condition.
Figure 2:
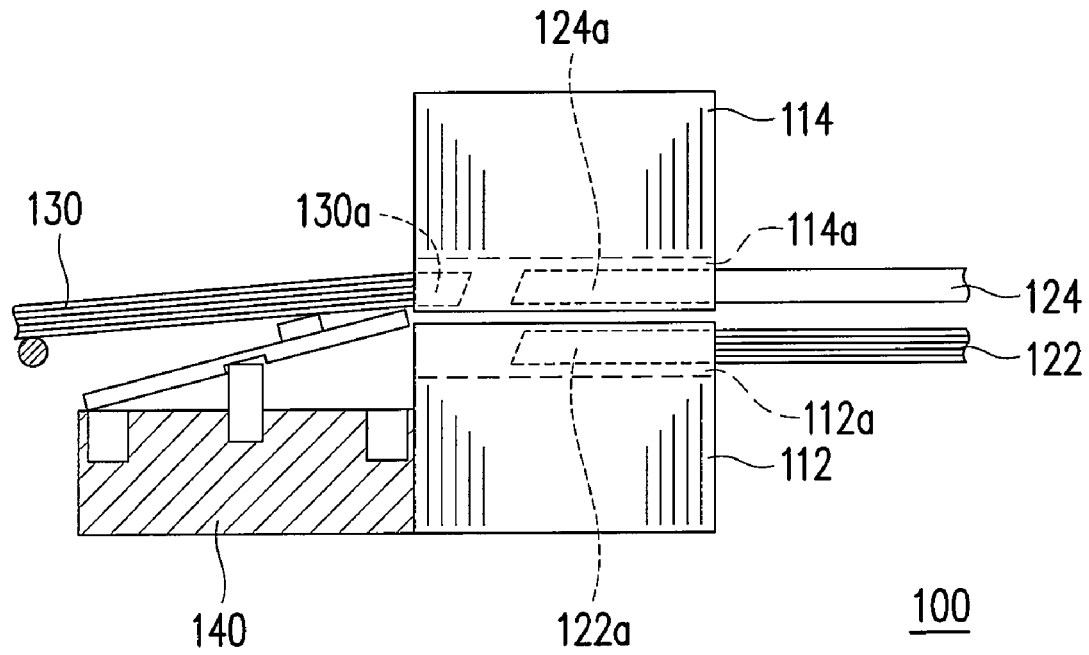
FIG. 2 is a side view illustrating the optical switch of FIG. 1 in a second condition.
Figure 3A:
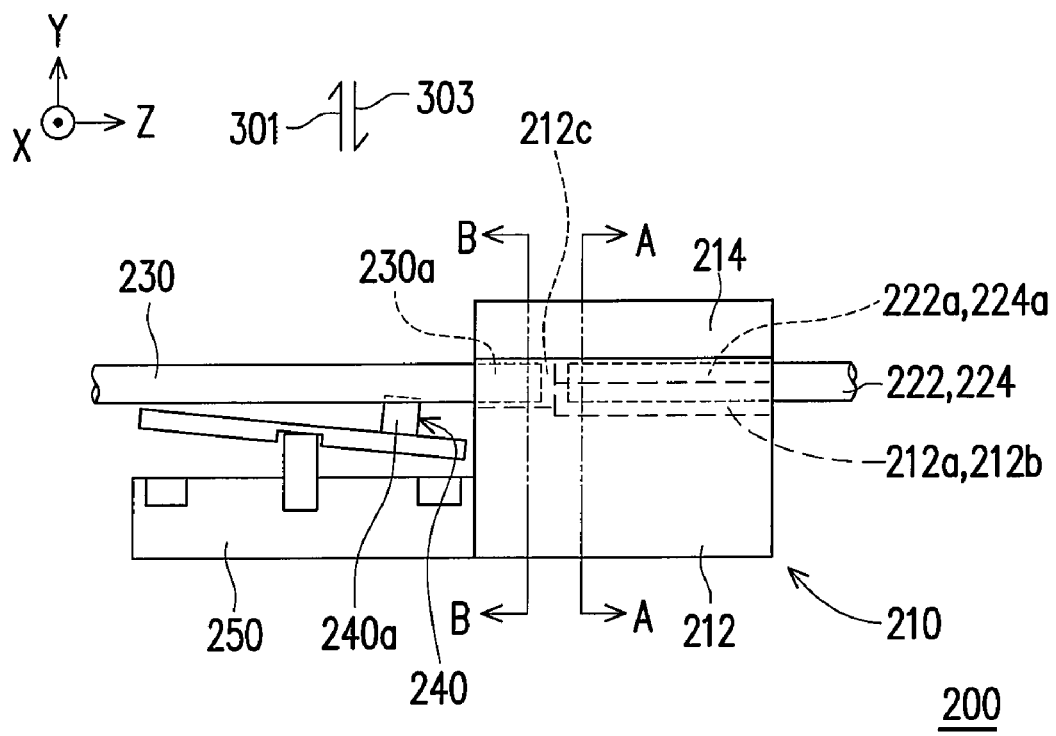
FIG. 3A is a side view illustrating an optical switch in a first condition according to an embodiment of the present invention.
Figure 3B:
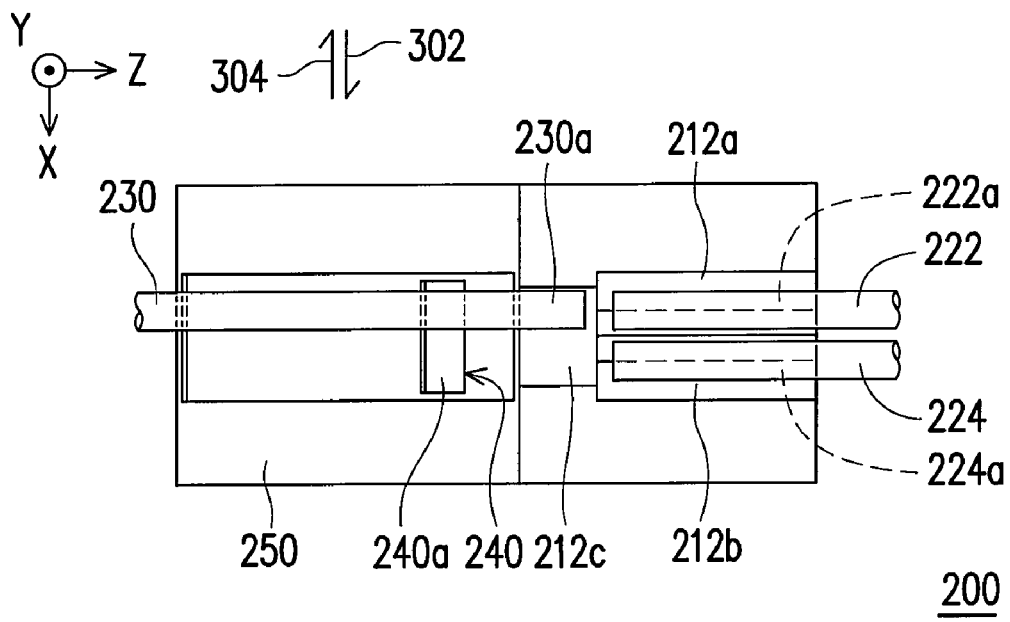
FIG. 3B is a top view illustrating the optical switch of FIG. 3A without disposing a cover thereon.
Figure 3C:
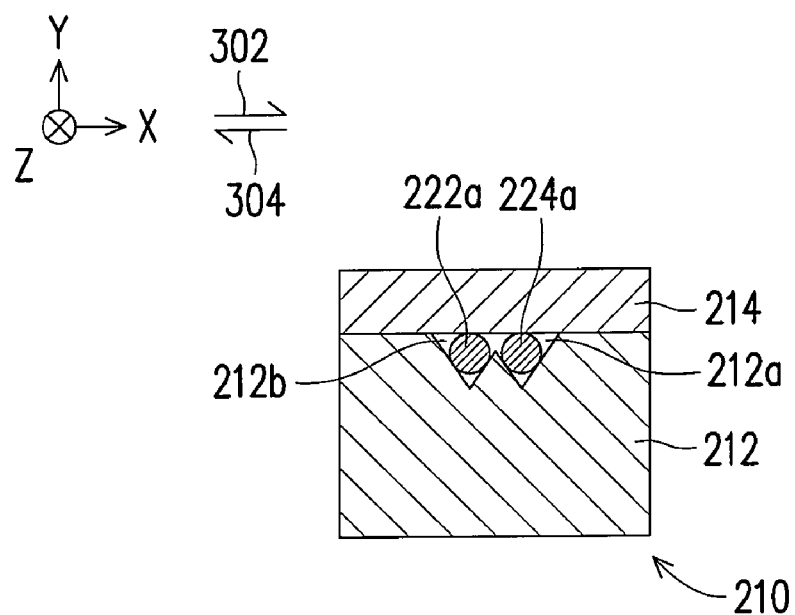
FIG. 3C is a cross-sectional view taken along line A-A in FIG. 3A.
Figure 3D:
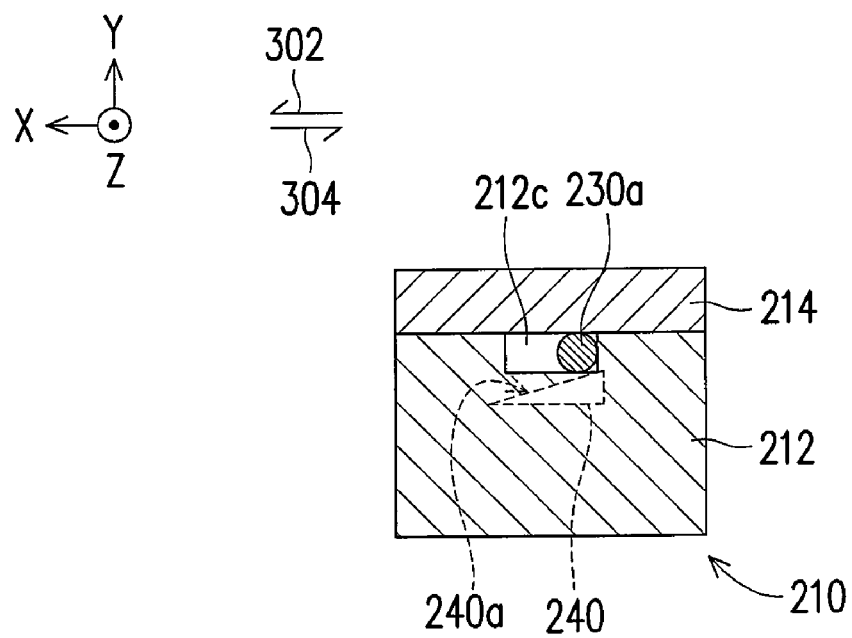
FIG. 3D is a cross-sectional view taken along line B-B in FIG. 3A.

Referring to FIGS. 3A to 3D, an optical switch 200 of the present embodiment includes an alignment head 210, a first fiber 222, a second fiber 224 and a third fiber 230. All of the components are installed in a housing (not shown).

The alignment head 210 has a base 212 and a cover 214. The base 212 has a first V-groove 212a, a second V-groove 212b, and a trench 212c linked to the first and the second V-grooves 212a and 212b.

An end 222a of the first fiber 222 is mounted in the first V-groove 212a and faces the trench 212c. An end 224a of the second fiber 224 is mounted in the second V-groove 212b and faces the trench 212c. The cover 214 is mounted on the base 212 to fix the ends 222a and 224a of the first and the second V-grooves 222 and 224. An end 230a of the third fiber 230 is located in the trench 212c and is capable of being moved in the trench 212c under control of the cover 214c. In a first condition, the end 230a of the third fiber 230 is aligned to the end 222a of the first fiber 222.

Figure 4A:
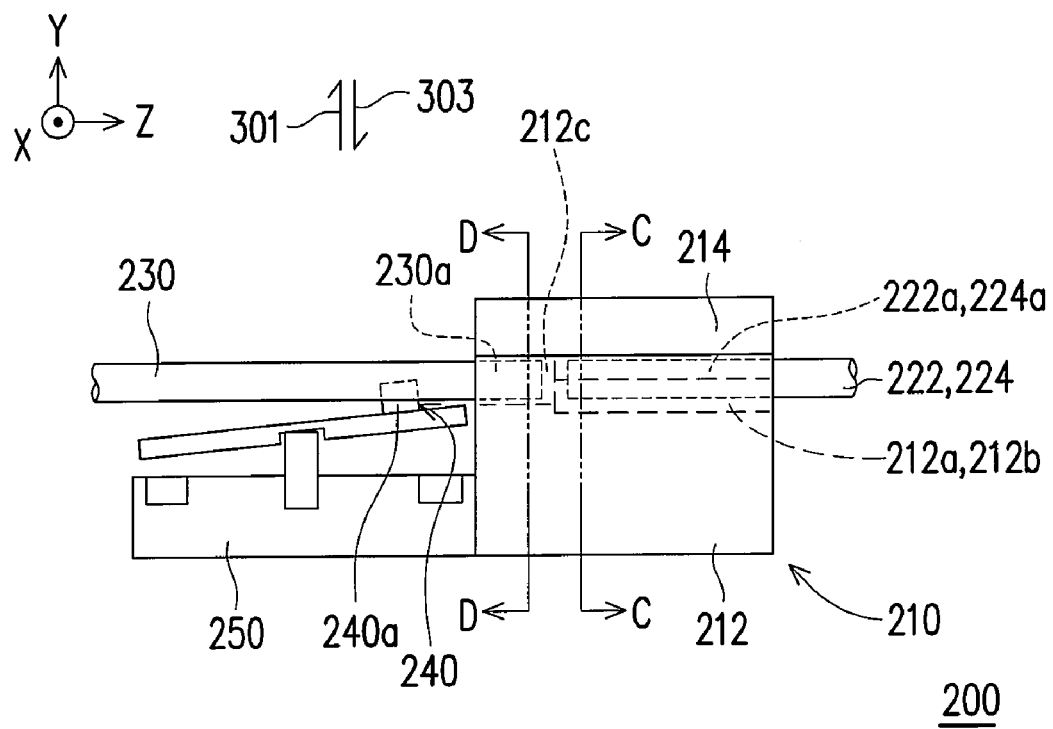
FIG. 4A is a side view illustrating the optical switch of FIG. 3A in a second condition.
Figure 4B:
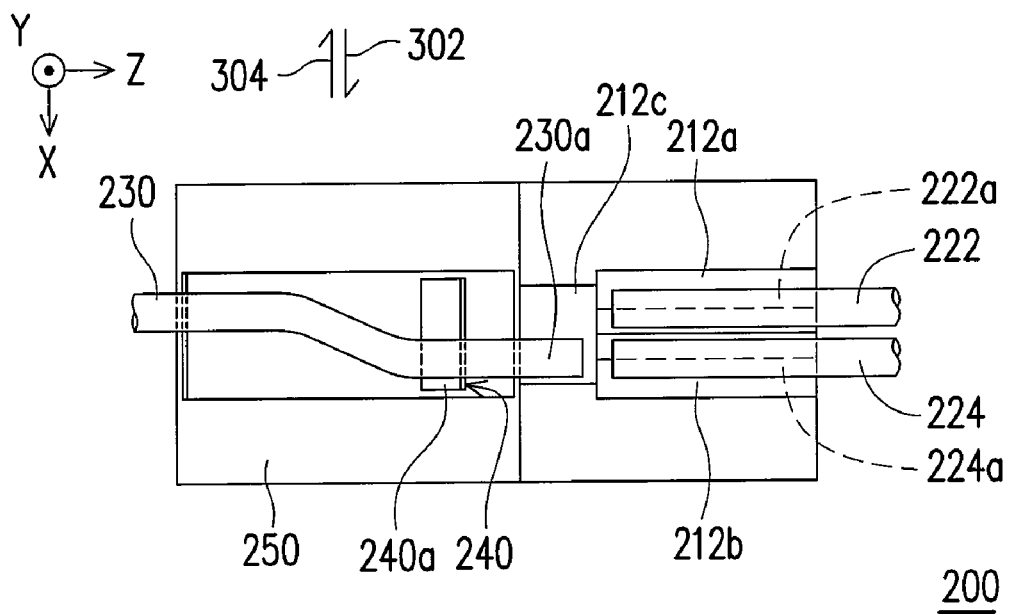
FIG. 4B is a top view illustrating the optical switch of FIG. 4A without disposing a cover thereon.
Figure 4C:
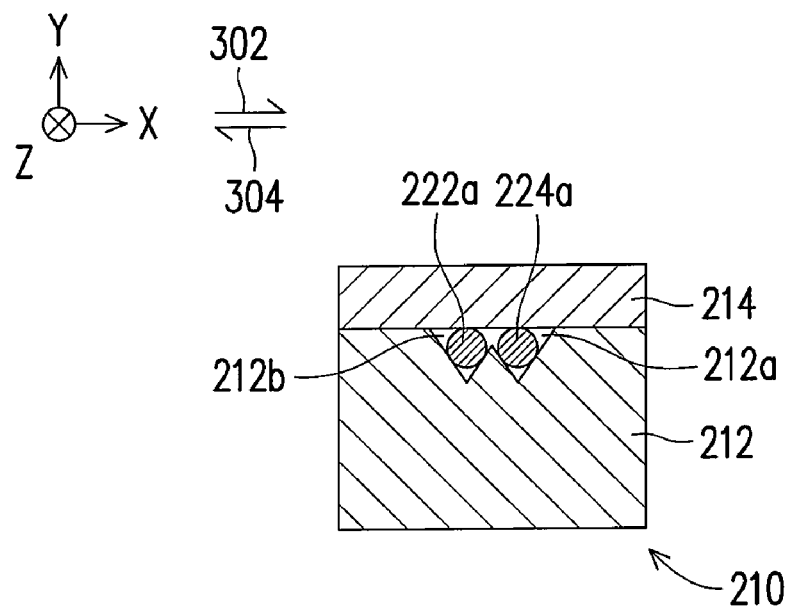
FIG. 4C is a cross-sectional view taken along line C-C in FIG. 4A.
Figure 4D:
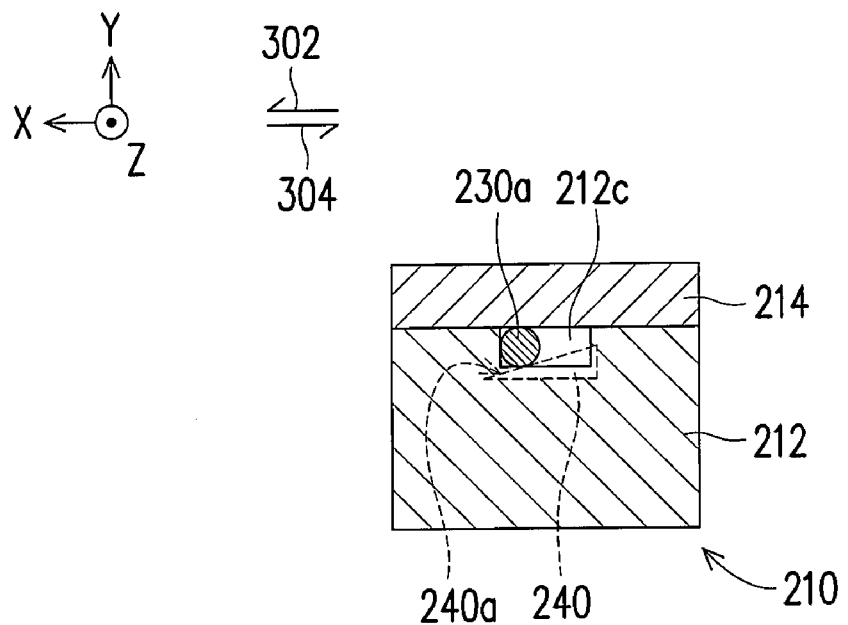
FIG. 4D is a cross-sectional view taken along line D-D in FIG. 4A.

In order to convert the first condition in which the end 230a of the third fiber 230 is aligned to the end 222a of the first fiber 222 into a second condition in which the end 230a of the third fiber 230 is aligned to the end 224a of the second fiber 224 (as shown in FIGS. 4A through 4D), the optical switch 200 of the present embodiment further includes a wedge 240 and a displacing means 250. The wedge 240 is located beside the base 212 and has an incline 240a, while the displacing means 250 is set under the wedge 240. In the present embodiment, the displacing means 250 may be a relay or an actuator.

Figure 5A:
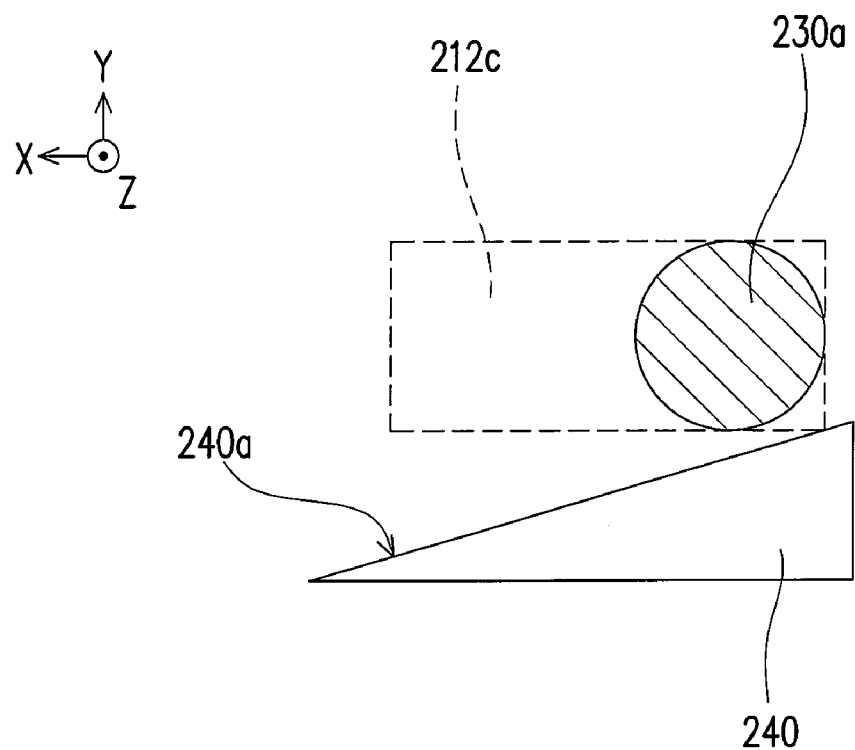
FIGS. 5A and 5B illustrate a third optical fiber in a trench before a displacing means pushes the third optical fiber and after the displacing means pushes the third optical fiber, respectively.
Figure 5B:
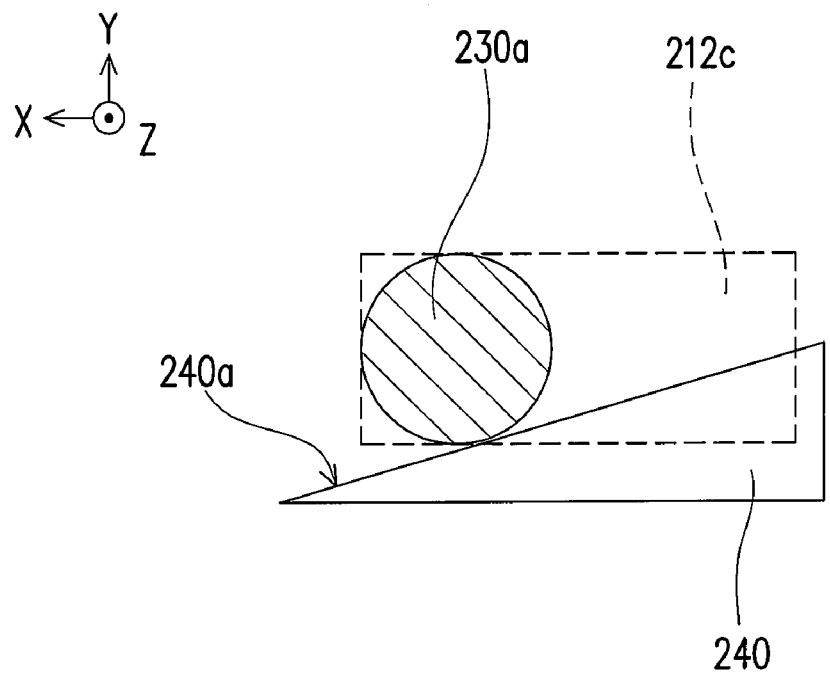

With reference to FIGS. 3A through 3D, FIGS. 4A through 4D and FIGS. 5A through 5B, as the end 230a of the third fiber 230 is aligned to the end 222a of the first fiber 222, the displacing means 250 is capable of moving the wedge 240 in a first direction 301 and applying a component force in a second direction 302 through a contact to an incline 240a of the wedge 240 to push the third fiber 230, so as to move the end 230a of the third fiber 230 in the trench 212c in the second direction 302 and to align the end 230a of the third fiber 230 to the end 224a of the second fiber 224. In the present embodiment, the first direction 301 may be a positive direction of the Y axis, while the second direction 302 may be a positive direction of the X axis.

By contrast, as the end 230a of the third fiber 230 is aligned to the end 224a of the second fiber 224, the displacing means 250 is capable of moving in a third direction 303 opposite to the first direction 301, such that the incline 240a of the wedge 240 stops applying the force to push the third fiber 230. Accordingly, in the present embodiment, the end 230a of the third fiber 230 moves in a fourth direction 304 opposite to the second direction 302 in the trench 212c to again align the end 230a of the third fiber 230 to the end 222a of the first fiber 222 by means of an elastic-restoring force of the third fiber 230. In the present embodiment, the third direction 303 may be a negative direction of the Y axis, while the fourth direction 304 may be a negative direction of the X axis.

Accordingly, through the incline 240a of the wedge 240, the displacement induced by the displacing means 250 in the first direction 301 can be converted to the displacement of the end 230a of the third fiber 230 in the second direction 302. Additionally, through a decrease in an included angle between a normal of the incline 240a of the wedge 240 and the first direction 301 i.e. an increase in the included angle between the normal of the incline 240a of the wedge 240 and the second direction 302, the displacement generated by the displacing means 250 in the first direction 301 is linearly extended to the displacement of the end 230a of the third fiber 230 in the second direction 302.

In the present embodiment, the first direction 301 is substantially perpendicular to the second direction 302. Nevertheless, in other embodiments which are not illustrated in the figures, a non-zero included angle between the first direction 301 and the second direction 302 may exist. Namely, the first direction 301 may slant to the second direction 302.

In the present embodiment, the first and the second V-grooves 212a and 212b of the base 212 may be arranged in the second direction 302, and a length direction of the first V-groove 212a is parallel to a length direction of the second V-groove 212b.

To sum up, the present invention is able to directly mount the two output optical fibers (the first and the second optical fibers) in the precisely-aligned V-grooves on the single alignment head formed by precision processing. Through the simple assembling process, the precise alignment of the input optical fiber (the third optical fiber) is completed. Thereby, the time-consuming alignment process of the conventional optical fibers is simplified, and thus the production costs of the optical switch are significantly reduced. Moreover, the present invention may utilize the existing displacing means (the relay or the actuator) along with the wedge having the incline for meeting the requirements for horizontal movement on an axial plane between the input optical fiber and the two output optical fibers. Furthermore, the displacing means having a small amount of displacement can be adopted to induce large displacement of the optical fiber through increasing a slope of the incline of the wedge. The above characteristics enable flexible purchase options of the components and a reduction of the costs of the components. Furthermore, the optical switch of the present invention may improve reliability and undergo strict condition inspection easily and successfully, for the optical switch is integrated as a whole through the precision processing.

Though the present invention has been disclosed above by the embodiment, they are not intended to limit the present invention. Anybody skilled in the art can make some modifications and variations without departing from the spirit and scope of the present invention. Therefore, the protecting range of the present invention falls in the appended claims.

What is claimed is:

1. An optical switch, comprising:
   an alignment head having a base and a cover, wherein the base has a first V-groove, a second V-groove, and a trench linked to the first and the second V-grooves;
   a first fiber mounted in the first V-groove;
   a second fiber mounted in the second V-groove, wherein the cover is mounted on the base to secure the first and the second fibers, respectively;
   a third fiber having an end located in the trench and aligned to an end of the first fiber;
   a wedge located beside the base and having an incline; and
   a displacing means set under the wedge, wherein
   as the end of the third fiber is aligned to the end of the first fiber, the displacing means is capable of moving the wedge in a first direction and applying a component force in a second direction through a contact to the incline of the wedge to push the third fiber, so as to move the end of the third fiber in the trench in the second direction and to align the end of the third fiber to the end of the second fiber, and wherein the first and the second V-grooves are arranged in the second direction; and
   as the end of the third fiber is aligned to the end of the second fiber, the displacing means is capable of moving in a third direction opposite to the first direction, such that the incline of the wedge does not push the third fiber, and the end of the third fiber moves in a fourth direction opposite to the second direction to again align the end of the third fiber to the end of the first fiber.

2. The optical switch as claimed in claim 1, wherein the first direction is substantially perpendicular to the second direction.

3. The optical switch as claimed in claim 1, wherein a length direction of the first V-groove is parallel to a length direction of the second V-groove.

4. The optical switch as claimed in claim 1, wherein the displacing means is a relay or an actuator.

* * * * *